United States Patent
Shin

(10) Patent No.: US 10,175,863 B2
(45) Date of Patent: Jan. 8, 2019

(54) VIDEO CONTENT PROVIDING SCHEME

(71) Applicant: KT Corporation, Seongnam-si, Gyeonggi-do (KR)

(72) Inventor: Jong Ho Shin, Yangpyeong-gun (KR)

(73) Assignee: KT CORPORATION, Seongnam-si, Gyeonggi-Do (KR)

( * ) Notice: Subject to any disclaimer, the term of this patent is extended or adjusted under 35 U.S.C. 154(b) by 375 days.

(21) Appl. No.: 14/337,449

(22) Filed: Jul. 22, 2014

(65) Prior Publication Data
US 2015/0033126 A1    Jan. 29, 2015

(30) Foreign Application Priority Data

Jul. 23, 2013 (KR) .......... 10-2013-0086868

(51) Int. Cl.
| | | |
|---|---|---|
| G06F 3/048 | (2013.01) | |
| G06F 3/0484 | (2013.01) | |
| G06F 3/0488 | (2013.01) | |
| G06F 3/0481 | (2013.01) | |
| G06F 17/30 | (2006.01) | |

(52) U.S. Cl.
CPC ........ *G06F 3/04842* (2013.01); *G06F 3/0481* (2013.01); *G06F 3/0488* (2013.01); *G06F 17/30* (2013.01)

(58) Field of Classification Search
CPC .. G06F 3/0481; G06F 3/04842; G06F 3/0488; G06F 17/30
See application file for complete search history.

(56) References Cited

U.S. PATENT DOCUMENTS

| | | | | |
|---|---|---|---|---|
| 2006/0041632 A1* | 2/2006 | Shah | .................. | G06F 17/30038 709/217 |
| 2007/0152984 A1* | 7/2007 | Ording | ................ | G06F 3/04845 345/173 |
| 2009/0046991 A1* | 2/2009 | Miyajima | ......... | G06F 17/30038 386/241 |
| 2010/0031132 A1* | 2/2010 | Yamaji | .................. | G06F 17/211 715/203 |
| 2010/0130226 A1* | 5/2010 | Arrasvuori | .............. | H04L 67/26 455/456.1 |
| 2011/0064281 A1* | 3/2011 | Chan | ....................... | G06Q 50/01 382/118 |
| 2011/0164163 A1* | 7/2011 | Bilbrey | ................. | G06F 1/1694 348/333.01 |
| 2013/0129142 A1* | 5/2013 | Miranda-Steiner | ......................... | G06K 9/00664 382/103 |
| 2014/0078076 A1* | 3/2014 | Wilensky | ................ | G06T 11/60 345/173 |
| 2014/0129625 A1* | 5/2014 | Haugen | ................... | H04W 4/08 709/204 |

(Continued)

FOREIGN PATENT DOCUMENTS

KR    1020100035043 A    4/2010

*Primary Examiner* — Andrew T Chiusano
(74) *Attorney, Agent, or Firm* — Brundidge & Stanger, P.C.

(57) ABSTRACT

In one example embodiment, an apparatus includes an object identifier configured to identify an object of a displayed image; an input receiver configured to receive a first user input to the object; a data generator configured to generate a description to be associated with the object, based on the received first user input; and a story generator configured to combine the object and the description.

10 Claims, 7 Drawing Sheets

(56) References Cited

U.S. PATENT DOCUMENTS

| | | | | |
|---|---|---|---|---|
| 2014/0129981 A1* | 5/2014 | Soderberg | ............ | G06F 3/0482 |
| | | | | 715/810 |
| 2014/0132634 A1* | 5/2014 | Wang | ................ | G06K 9/00221 |
| | | | | 345/634 |
| 2014/0140630 A1* | 5/2014 | Hwang | ............ | G06F 17/30256 |
| | | | | 382/218 |
| 2014/0160316 A1* | 6/2014 | Hwang | ............ | G06F 17/30268 |
| | | | | 348/231.99 |
| 2016/0093106 A1* | 3/2016 | Black | ................ | G06K 9/00624 |
| | | | | 345/633 |
| 2016/0105388 A1* | 4/2016 | Bin Mahfooz | ..... | G06F 3/04817 |
| | | | | 709/206 |

\* cited by examiner

VIDEO CONTENT PROVIDING SCHEME

TECHNICAL FIELD

The embodiments described herein pertain generally to a video content providing scheme.

BACKGROUND

Technologies continue to enhance our use of digital data, such as digital photos and videos, by making them easy to store, access, and share. As digital devices (e.g., smart phones, digital cameras or smart televisions) become more ubiquitous and digital data formats increase in usage, particularly in the consumer market, more users will want to use and share digital data.

SUMMARY

In one example embodiment, an apparatus may include: an object identifier configured to identify an object of a displayed image; an input receiver configured to receive a first user input to the object; a data generator configured to generate a description to be associated with the object, based on the received first user input; and a story generator configured to combine the object and the description.

In another example embodiment, a method performed under control of an apparatus may include: receiving a first user input; identifying an object of a displayed image, based on the received first user input; receiving a second user input; generating a description to be associated with the identified object, based on the received second user input; and combining the identified object and the generated description.

In yet another example embodiment, a computer-readable storage medium may store thereon computer-executable instructions that, in response to execution, cause an apparatus to perform operations including receiving a first user input; identifying an object of a displayed image, based on the received first user input; receiving a second user input; generating a description to be associated with the identified object, based on the received second user input; combining the identified object and the generated description; and classifying the combined object and description into one of a plurality of predefined categories, based on at least one of the object or the description.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
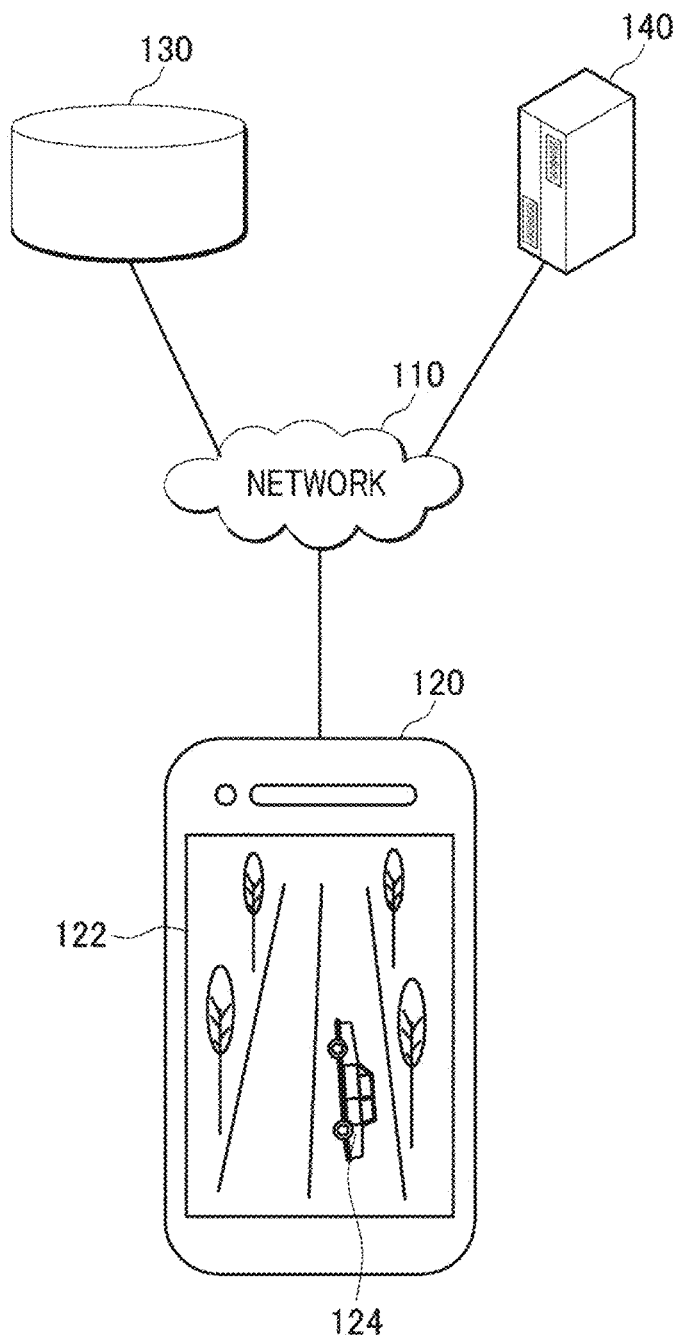
FIG. 1 shows an example system in which one or more embodiments of a video content providing scheme may be implemented, in accordance with various embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system 10 in which one or more embodiments of a video content providing scheme may be implemented, in accordance with various embodiments described herein. As depicted in FIG. 1, system configuration 10 may include, at least, a first device 120, a database 130 and a second device 140. At least two or more of first device 120, database 130 and second device 140 may be communicatively connected to each other via a network 110.

Network 110 may include, as non-limiting examples, a wired network such as a LAN (Local Area Network), a WAN (Wide Area Network), a VAN (Value Added Network) or the like. Other non-limiting examples of network 110 may include wireless networks such as a mobile radio communication network, including at least one of a 3rd generation (3G) mobile telecommunications network, a 4th or $5^{th}$ generation mobile telecommunications network, various other mobile telecommunications networks, a satellite network, WiBro (Wireless Broadband Internet), Mobile WiMAX, HSDPA (High Speed Downlink Packet Access), Bluetooth, or the like.

First device 120 may include, for example, but not as a limitation, a notebook computer, a personal computer, a smart phone, a digital camera, a remote controller, a tablet computer, a phablet device, or a personal communication terminal, such as PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminal.

First device 120 may be configured to display an image 122 on a display that may be part of, or communicatively coupled to, first device 120. Image 122 may include, as non-limiting examples, a photo, a frame or a sequence of frames from video content that is played or reproduced by first device 120.

First device 120 may be configured to receive a user input to select at least one object 124 included in displayed image 122. Non-limiting examples of the user input to select object 124 may include at least one of a touch input, an audio input, a gesture input, a pointer input or a text input. That is, the user input to select object 124 may serve to select, highlight, or otherwise identify object 124 as a designated object.

Further, non-limiting examples of object 124 may include a building, an automobile, a person, an animal, a tree or a mountain that may be displayed in image 122.

First device 120 may be configured to identify an image of object 124 from image 122, upon first device 120 receiving the user input to select object 124. For example, but not as a limitation, first device 120 may be configured to identify and/or extract the image of object 124 from image 122 by using any well-known object recognition schemes or image extracting schemes. Having been thus identified, object 124 may then be a subject or an element of digital storytelling in accordance with one or more embodiments described herein.

In some embodiments, first device 120 may be configured to identify images of multiple objects 124 from image 122, upon first device 120 receiving a predefined input such as one or more predefined gesture commands, one or more predefined touch commands, or one or more predefined voice commands. Non-limiting examples of such predefined touch commands may include a touch input in the form of a star, input as a sweeping or swiping motion by a user's finger. For example, but not as a limitation, first device 120 may be configured to identify one or more images of object 124 depicted on image 122, when first device 120 receives a predefined touch input, e.g., a star on displayed image 122. Thus, images of object 124 may presently and subsequently identified as subjects for digital storytelling, in accordance with one or more embodiments described herein. Information regarding the predefined user input, e.g., star, to identify the images of displayed object 124 may be predefined or pre-registered in first device 120 by a user who controls operation of first device 120. For example, a user of first device 120 has already known that if he/she draws a star on image 122 by a finger, all object 124 displayed in image 122 are selected. Further, if the user of first device 120 draws a star on image 122 by a finger, first device 120 may be configured to identify images of all object 124 from image 122.

In some other embodiments, first device 120 may be configured to identify an image of object 124 as a subject for digital storytelling, upon first device 120 receiving a predefined input such as one or more predefined gesture commands, one or more predefined touch commands, one or more predefined voice commands, or any combination thereof. Non-limiting examples of such predefined touch commands may include a touch input in the form of a triangle. For example, but not as a limitation, first device 120 may be configured to identify an image of object 124 (e.g., an automobile) depicted on image 122, when first device 120 receives a predefined touch input, e.g., a triangle on displayed image 122. Thus, the image of object 124 (e.g., an automobile) may presently identified as a subject for digital storytelling, in accordance with one or more embodiments described herein. Information regarding the predefined user input, e.g., triangle, to identify the image of displayed object 124 may be predefined or pre-registered in first device 120 by a user who controls operation of first device 120. For example, a user of first device 120 has already known that if he/she draws a triangle on image 122 by a finger, an automobile object displayed in image 122 is selected. Further, when the user of first device 120 draws a triangle on image 122 by a finger, first device 120 may be configured to identify an image of an automobile object from image 122.

Further, for the purpose of digital storytelling, first device 120 may also be configured to receive a user input as part of a narrative for object 124. Non-limiting examples of the narrative user input associated with identified object 124 may include at least one of an audio input, a gesture input, a text input, or any combination thereof. First device 120 may be configured to receive the narrative user input to be associated with identified object 124 via a user input interface, such as a microphone, a keyboard, a mouse, a motion sensing device, etc.

Thus, first device 120 may be configured to generate a narrative or description that is to be associated with identified object 124, based at least in part on the received narrative user input to identified object 124, as part of a digital story. For example, but not as a limitation, the narrative or description may include a caption, voice data, or text data. In some embodiments, first device 120 may be configured to receive, copy, and/or extract a text or audio from the received narrative user input to identified object 124 by using any well-known voice or text recognition and extracting schemes. In some other embodiments, first device 120 may be configured to translate the gesture user input into text or audio. Regardless, first device 120 may then convert the received, copied and/or extracted text and/or audio into the narration or description that is to be associated with identified object 124. The description of how the text and/or audio may be associated with identified object 124 is described further below.

In some other embodiments, first device 120 may be configured to generate the narration or description by identifying a voice user input that begins after receiving a first predefined voice command (e.g., "start") and ends just prior to receiving a second predefined voice command (e.g., "end"). For example, if a user of first device 120 makes a voice input of "start", "happy" and "end", in sequence, to a microphone of first device 120, first device 120 may identify "happy" as the narration or description to associate with identified object 124.

In some embodiments, first device 120 may be configured to receive a user input to indicate that identified object 124 is to be a subject of a particular digital story multiple times. For example, if first device 120 receives a predefined voice input, e.g., "repeat," or a predefined gesture input, e.g., an exclamation point, first device 120 may identify object 124 and an associated narration and/or description as being likely re-used within a same digital story or another digital story.

Further, first device 120 may be configured to combine identified object 124 and the generated narration and/or description. In some embodiments, first device 120 may be configured to combine identified object 124 and the generated narration and/or description to generate a digital story component or element. Multiple digital story components may constitute a whole digital story. The digital story component or element may include one or more images of identified object 124 and narrations and/or descriptions associated with respective one of the one or more images.

In some embodiments, first device 120 may be configured to generate metadata that is associated with object 124. For example, but not as a limitation, the metadata corresponding to object 124 may include at least one of a tag or a label. As a non-limiting example, the metadata corresponding to object 124 may include at least one: of a timestamp indicating a time at which image 122, including object 124, was generated by first device 120; a location at which image 122, including object 124, was generated by first device 120; etc. For example, the metadata regarding the location at which image 122, including object 124, was generated by first device 120 may include coordinates of the location. The coordinates of the location may be estimated by a GPS (global positioning system) sensor coupled to first device 120. As another example, the metadata corresponding to object 124 may further include identification information, such as a name of the object, a descriptive type of the object, or a category of the object, used to identify and classify object 124. Further, first device 120 may be configured to combine the generated metadata with object 124 and the generated narration and/or description.

First device 120 may be configured to transmit the combined object 124 and narration and/or description (i.e., a digital story component or element) to second device 140 via network 110. Alternatively, first device 120 may be configured to transmit the combined object 124, narration and/or description, and metadata to second device 140 via network 110.

In some embodiments, second device 140 may refer a device that is communicatively coupled to first device 120, such as a notebook computer, a personal computer, a smart phone, a digital camera, a remote controller, a tablet computer, a phablet device, or a personal communication terminal, such as PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminal. In some other embodiments, second device 140 may refer to one or more servers hosted and/or supported by a service providing organization or entity that provides content market services, content providing services, and/or social network services to first device 120.

First device 120 may be configured to classify the combined object 124, narration and/or description, and/or metadata into one of multiple categories, based on at least one of identified object 124 or the narration and/or description. For example, but not as a limitation, first device 120 may be configured to classify the digital story component in which identified object 124 and the narration and/or description are combined into one of multiple categories, based on at least one of identified object 124 or the associated narration and/or description. First device 120 may be configured to classify the digital story component automatically, by using a well-known automatic classifying mechanism using at least one of clustering, classification, correlation or context recognition. First device 120, for example, but not as a limitation, may have multiple reference object images and/or multiple reference keywords that respectively correspond to each of the multiple categories. Further, first device 120 may be configured to calculate a first similarity between identified object 124 and the multiple reference object images. Further, first device 120 may be configured to determine a category to which the digital story component to be classified, if the first similarity is greater than a threshold value. Alternatively, first device 120 may be configured to calculate a second similarity between texts included in the narration and/or description and the multiple reference keywords. Further, first device 120 may be configured to determine a category to which the digital story component may be classified, if the second similarity is greater than a threshold value.

In some embodiments, first device 120 may be configured to receive a user input to define the multiple categories. For example, but not as a limitation, the user input may include a text input or an audio input. Further, first device 120 may be configured to determine multiple directories that may respectively correspond to the multiple defined categories in database 130, based on the received user input. In some embodiments, first device 120 may be configured to define the multiple categories and to generate the multiple directories in a hierarchical order in database 130. Then, first device 120 may store the classified combined object 124 and associated narration and/or description (i.e., a digital story component) in one of the multiple directories in database 130, based at least in part on the classified defined multiple categories. For example, database 130 may refer to a database server, apparatus or a cloud datacenter communicatively coupled to first device 120. As another example, first device 120 may be configured to generate the multiple directories in a local memory of first device 120, and to store the classified combined object 124 and associated narration and/or description on in one of the multiple directories in the local memory.

First device 120 may be configured to receive a user input to select at least one category from among the multiple classified defined categories. For example, but not as a limitation, first device 120 may be configured to receive an input that includes a name or a keyword that corresponds to a defined category. Further, first device 120 may be configured to select and/or identify a directory that corresponds to the selected category. Further, first device 120 may be configured to select and/or extract the combined object 124 and description (e.g., the digital story component) that correspond to the selected category from the directory in database 130.

Further, first device 120 may be configured to generate and/or finalize the whole digital story, based on the selected combined object 124 and narration and/or description. For example, but not as a limitation, first device 120 may be configured to generate video content that includes the selected object 124 and the narration and/or description associated with the selected object 124 by using a well-known story telling content generating mechanism or template. For example, but not as a limitation, first device 120 may execute a digital storytelling program on first device 120 to generate a digital story, in which multiple objects, including object 124, and descriptions associated with the multiple objects are contextually displayed.

In some embodiments, first device 120 may be configured to then play the whole digital story on the display that may be part of, or communicatively coupled to, first device 120.

In some other embodiments, first device 120 may be configured to transmit the generated whole digital story to second device 140. In some other embodiments, first device 120 may be configured to transmit the generated whole digital story to database 130 to store the digital story.

Thus, FIG. 1 shows example system 10 in which one or more embodiments of a video content providing scheme may be implemented, in accordance with various embodiments described herein.

Figure 2:
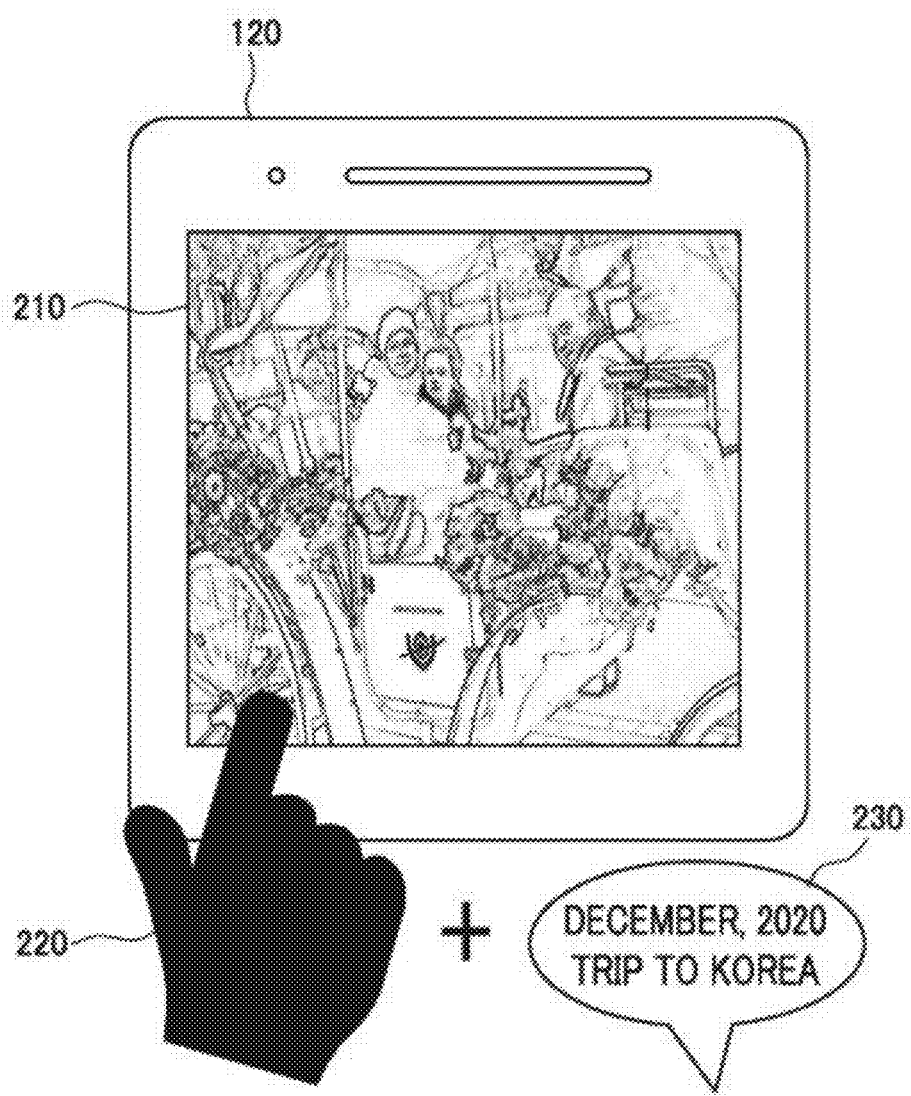
FIG. 2 shows an example device in which at least portions of a video content providing scheme may be implemented, in accordance with various embodiments described herein.

FIG. 2 shows an example device in which at least portions of a video content providing scheme may be implemented, in accordance with various embodiments described herein. For example, as depicted in FIG. 2, first device 120 may be configured to display an image 210 on a display that may be part of, or communicatively coupled to, first device 120. Image 210 may be at least one of a picture or a frame of video content or IPTV content that includes at least one of video-on-demand content, real-time broadcasting content or user interactive content (e.g., games).

First device 120 may be configured to receive a first user input to select image 210. For example, but not as a limitation, as depicted in FIG. 2, first device 120 may be configured to receive a touch input 220 to a part of image 210 during a predetermined time (e.g., a user of first device 120 touches a display of a part of image 210 for three seconds) or to receive touch input 220 to a predefined part of image 210. First device 120 may be further configured to identify image 210, based on received touch input 220.

Further, first device 120 may be configured to receive a second user input directed towards selected image 210. For example, but not as a limitation, first device 120 may be configured to receive a voice input 230 to provide narrative or descriptive information regarding selected image 210, such as "December, 2020, trip to KOREA" a predefined time (e.g., three seconds) after the first user input was received.

Further, first device 120 may be configured to generate a narration and/or description that corresponds to image 210, based at least in part on the received second user input. For example, the description may include a caption, voice data, or text data. Further, first device 120 may be configured to combine image 210 and the generated narration and/or description to make a digital story component.

Further, first device 120 may be configured to classify the combined image 210 and narration and/or description (i.e., digital story component) into one of multiple predefined categories. Further, first device 120 may be configured to store the combined image 210 and narration and/or description in one of multiple directories corresponding to the classified predefined categories in database 130.

Thus, FIG. 2 shows an example device in which at least portions of a video content providing scheme may be implemented, in accordance with various embodiments described herein.

Figure 3:
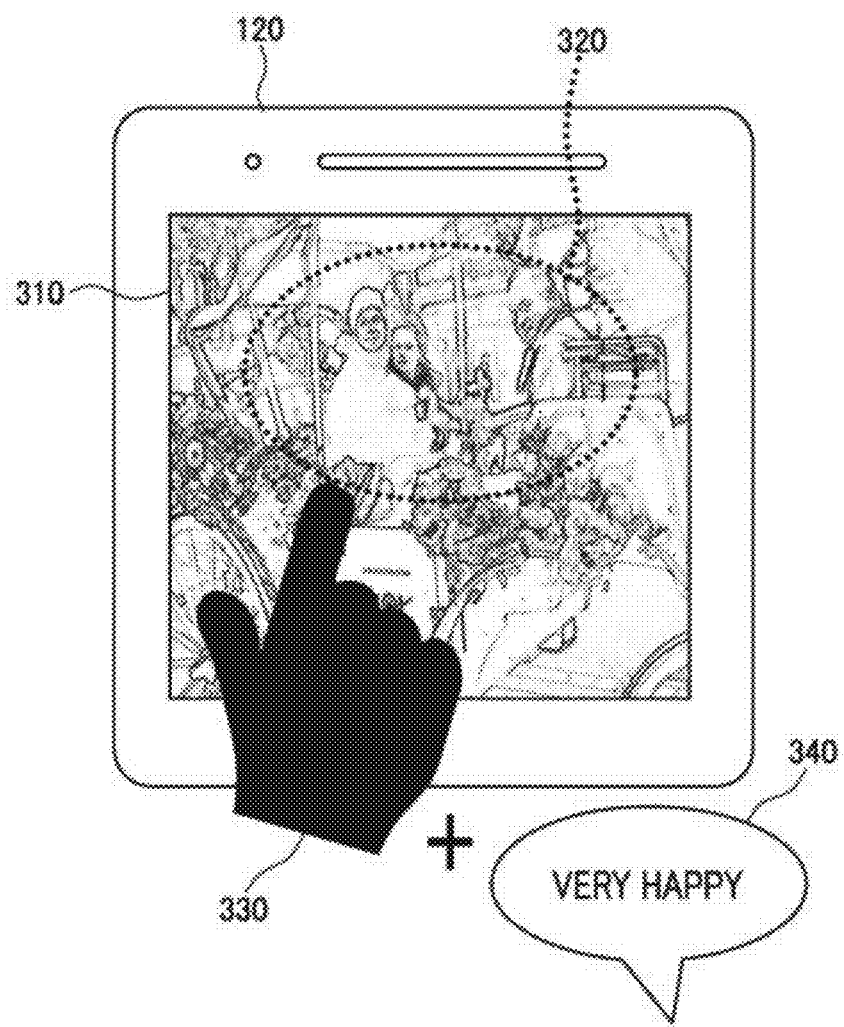
FIG. 3 shows another example device in which at least portions of a video content providing scheme may be implemented, in accordance with various embodiments described herein.

FIG. 3 shows another example device in which at least portions of a video content providing scheme may be implemented, in accordance with various embodiments described herein. For example, as depicted in FIG. 3, first device 120 may be configured to display an image 310 on a display that may be part of, or communicatively coupled to, first device 120. Image 310 may be at least one of a picture or a frame of video content or IPTV content that includes at least one of video-on-demand content, real-time broadcasting content or user interactive content (e.g., games).

First device 120 may be configured to receive a first user input to select at least one object 320 included in image 310. For example, but not as a limitation, as depicted in FIG. 3, a user of first device 120 may select his/her family 320 in image 310 by drawing a circle that surrounds images of family 320 on the display by his/her finger or a stylus pen. As another example, the user of first device 120 may select family 320 in image 310 by just touching a display of respective facial image of family 320. First device 120 may be configured to receive a touch input 330 e.g., that draws the circle to surround the images of family 320 included in image 310. First device 120 may be configured to identify the images of family 320, based on received touch input 330.

Further, first device 120 may be configured to receive a second user input directed towards at least selected object 320 included in image 310. For example, but not as a limitation, first device 120 may be configured to receive, a predefined time (e.g., three seconds) after the first user input was received, a voice input 340, such as "very happy", that may serve as a narration or description of image 310.

Further, first device 120 may be configured to generate a narration or description that corresponds to at least one object 320, based at least in part on the received second user input. For example, the description may include a caption, voice data, or text data. Further, first device 120 may be configured to combine at least one object 320 and the generated narration or description to make a digital story component.

Further, first device 120 may be configured to classify the combined at least one object 320 and narration or description (i.e., digital story component) into one of multiple predefined categories. Further, first device 120 may be configured to store the combined at least one object 320 and narration or description in one of multiple directories corresponding to the classified predefined categories in database 130.

Thus, FIG. 3 shows another example device in which at least portions of a video content providing scheme may be implemented, in accordance with various embodiments described herein.

Figure 4:
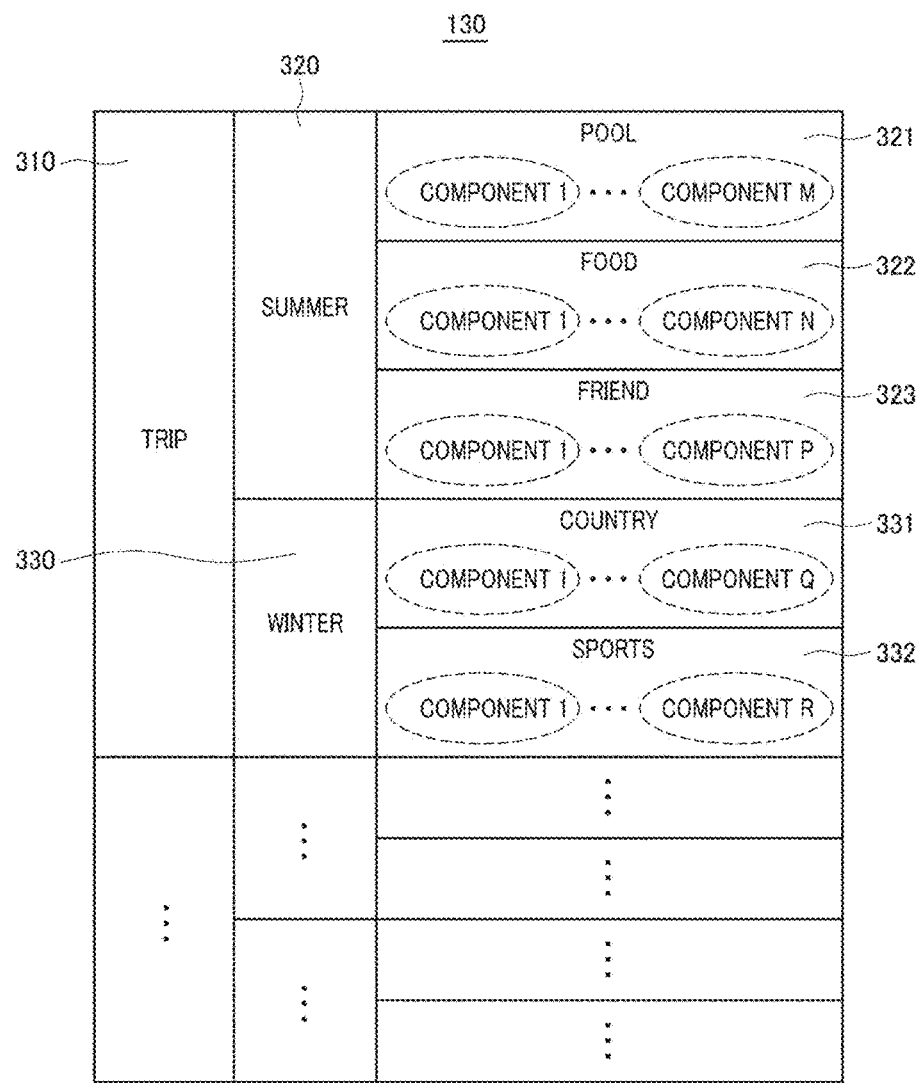
FIG. 4 shows an example database by which at least portions of a video content providing scheme may be implemented, in accordance with various embodiments described herein.

FIG. 4 shows an example database by which at least portions of a video content providing scheme may be implemented, in accordance with various embodiments described herein. In some embodiments, database 130 may be configured to store multiple digital story components in each of which at least one object and at least one narration and/or description associated with the object may be combined. Database 130 may have multiple directories that respectively correspond to multiple categories. Further, database 130 may have the multiple directories in a hierarchical order.

For example, but not as a limitation, as depicted in FIG. 4, database 130 may have a first level directory 310 that may correspond to a first level category "trip". Further, database 130 may have two second level directories 320 and 330 under first level directory 310. Second level directory 320 may correspond to a second level category "summer", and second level directory 330 may correspond to a second level category "winter". Further, database 130 may have multiple third level directories 321, 322, 323, 331 and 332. Third level directories 321, 322 and 323 may be under second level directory 320, and third level directories 331 and 332 may be under second level directory 330. Third level directory 321 may correspond to a third level category "pool", third level directory 322 may correspond to a third level category "food", and third level directory 323 may correspond to a third level category "friend". Further, third level directory 331 may correspond to a third level category "country", and third level directory 332 may correspond to a third level category "sports". However, the number of directories and categories in database 130 may be changed. Further, the subject assigned to each category may be changed.

Further, as depicted in FIG. 4, multiple digital story components may be stored in each third level directories 321, 322, 323, 331 and 332. For example, first device 120 may be configured to classify each of the multiple digital story components, in which the object and the narration and/or description are combined, into one of the multiple third level categories based on at least one of the object and the narration and/or description. Further, first device 120 may be configured to store each of the multiple digital story components in one of multiple third level directories 321, 322, 323, 331 and 332, based on the corresponding classified category.

Thus, FIG. 4 shows an example database 130 by which at least portions of a video content providing scheme may be implemented, in accordance with various embodiments described herein.

Figure 5:
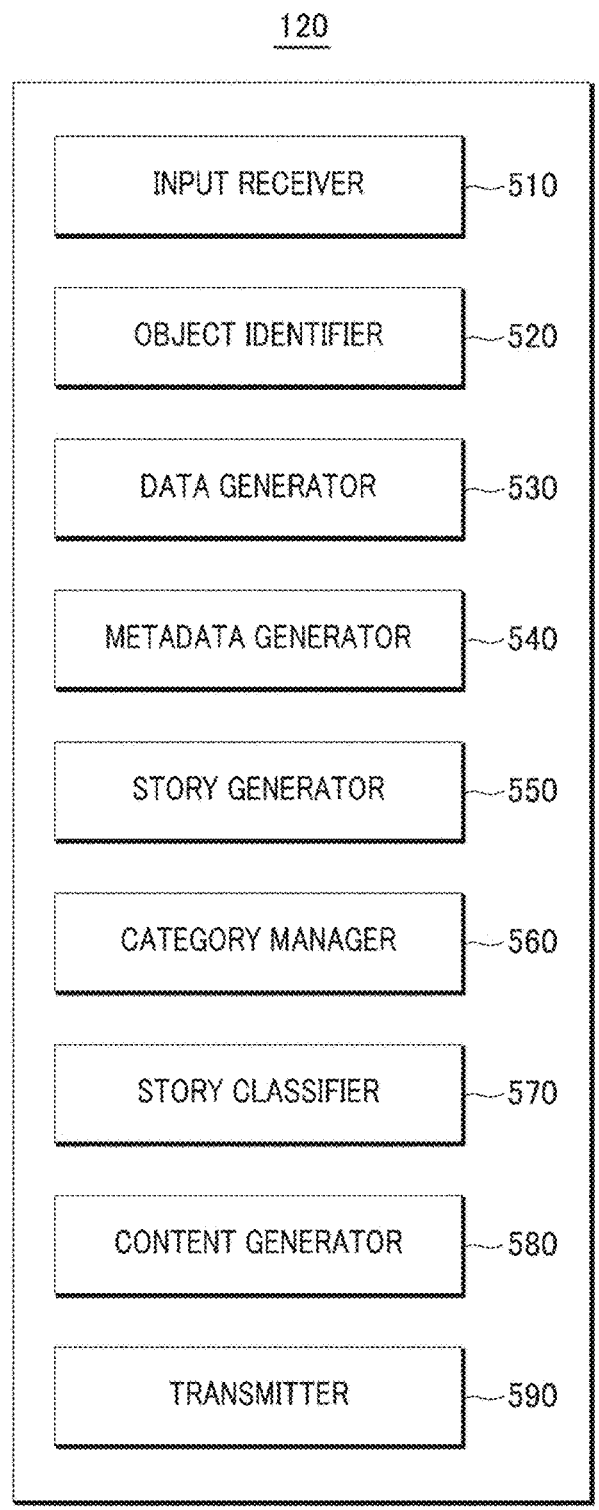
FIG. 5 shows an example device by which at least portions of a video content providing scheme may be implemented, in accordance with various embodiments described herein.

FIG. 5 shows an example device by which at least portions of a video content providing scheme may be implemented, in accordance with various embodiments described herein. As depicted in FIG. 5, for example, first device 120 may include an input receiver 510, an object identifier 520, a data generator 530, a metadata generator 540, a story generator 550, a category manager 560, a story classifier 570, a content generator 580, and a transmitter 590. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof. In that regard, one or more of input receiver 510, object identifier 520, data generator 530, metadata generator 540, story generator 550, category manager 560, story classifier 570, content generator 580, and transmitter 590 may be included in an instance of an application hosted on first device 120.

Input receiver 510 may be configured to receive a user input to select an object included in an image displayed on a display that may be part of, or communicatively coupled to, first device 120. Non-limiting examples of the user input to select the object may include at least one of a touch input, an audio input, a gesture input, a pointer input or a text input.

Further, input receiver 510 may be configured to receive a user input directed towards the selected object. The user input to the selected object may be used to generate, by data generate 530, a narration or description to be associated with the selected object. Non-limiting examples of the user input to provide narrative or descriptive information regarding the selected object may include at least one of an audio input, a gesture input, a text input, or any combination thereof.

Further, input receiver 510 may be configured to receive a user input to define multiple categories to which multiple combined objects and narrations or descriptions to be classified.

Further, input receiver 510 may be configured to receive a user input to select at least one category from among the multiple classified defined categories. For example, input receiver 510 may be configured to receive an input that includes a name or a keyword that corresponds to at least one defined category.

Object identifier 520 may be configured to identify an image of the object from the displayed image, based on the user input to select the object received by input receiver 510. For example, but not as a limitation, object identifier 520 may be configured to identify the image of the object by using any well-known object recognition schemes or image extracting schemes.

In some embodiments, object identifier 520 may be configured to identify images of multiple objects from the displayed image, when input receiver 510 receives a predefined input such as one or more predefined gesture commands, one or more predefined touch commands, or one or more predefined voice commands. Non-limiting examples of such predefined touch commands may include a touch input in the form of a star, input as a sweeping or swiping motion by a user's finger. For example, but not as a limitation, object identifier 520 may be configured to identify images of all objects depicted on the displayed image, when input receiver 510 receives a predefined touch input, e.g., a star on the displayed image. Thus, images of all objects may presently and subsequently identified as subjects for digital storytelling, in accordance with one or more embodiments described herein.

In some other embodiments, object identifier 520 may be configured to identify an image of a predefined object from the displayed image, when input receiver 510 receives a predefined input such as one or more predefined gesture commands, one or more predefined touch commands, one or more predefined voice commands, or any combination thereof. Non-limiting examples of such predefined touch commands may include a touch input in the form of a triangle. For example, but not as a limitation, object identifier 520 may be configured to identify an image of a predefined object (e.g., an automobile) on the displayed image, when input receiver 510 receives a predefined touch input, e.g., a triangle on the displayed image.

Data generator 530 may be configured to generate a narration or a description that is to be associated with the identified object, based at least in part on the narrative user input to the identified object, which is received by input receiver 510, as part of a digital story. For example, but not as a limitation, the narration and/or description may include a caption, voice data, or text data. In some embodiments, data generator 530 may be configured to receive, copy and/or extract a text or audio from the received narrative user input to the identified object by using any well-known voice or text recognition and extracting schemes. In some other embodiments, data generator 530 may be configured to translate the received gesture user input into text or audio. Regardless, data generator 530 may then convert the received, copied and/or extracted text or audio into the narration and/or description that is to be associated with the identified object.

Metadata generator 540 may be configured to generate metadata that is associated with each object. For example, but not as a limitation, the metadata corresponding to each object may include at least one of a tag or a label. As a non-limiting example, the metadata may include at least one: of a timestamp indication a time at which an image, including the object, was generated by first device 120; a location at which the image, including the object, was generated by first device 120; etc. For example, the metadata regarding the location at which the image, including the object, was generated by first device 120 may include coordinates of the location. The coordinates of the location may be estimated by a GPS (global positioning system) sensor coupled to first device 120. As another example, the metadata corresponding to each object may further include identification information, such as a name of each object, a descriptive type of each object or a category of each object used to identify and classify each object.

Story generator 550 may be configured to combine the object identified by object identifier 520 and the narration and/or description generated by data generator 530. In some embodiments, story generator 550 may be configured to combine the object and the narration and/or description to generate a story component that is to be used to generate a digital story. Multiple digital story components may constitute a whole digital story. The digital story component may include one or more image and narrations or descriptions associated with respective one of the one or more images. Further, story generator 550 may be configured to further combine the metadata generated by metadata generator 540 with the object and the description.

Category manager 560 may be configured to determine multiple directories that may respectively correspond to multiple categories, based on the user input to define the multiple categories. In some embodiments, category manager 560 may be configured to define the multiple categories, based on the user input, and to generate the multiple directories in a hierarchical order in database 130.

Story classifier 570 may be configured to classify the combined object, narration and/or description, and/or metadata into one of the multiple categories, based on at least one of the identified object or the narration and/or description. For example, story classifier 570 may be configured to classify the digital story component in which the identified object and the narration and/or description are combined into one of the multiple categories, automatically, by using a well-known automatic classifying mechanism using at least one of clustering, classification, correlation or context recognition. Story classifier 570, for example, but not as a limitation, may have multiple reference object images and/or multiple reference keywords that respectively correspond to each of the multiple categories. Further, story classifier 570 may be configured to calculate a first similarity between the object and the multiple reference object images. Further, story classifier 570 may be configured to determine a category to which the digital story component to be classified, if the first similarity is greater than a threshold value. Alternatively, story classifier 570 may be configured to calculate a second similarity between texts included in the narration and/or description and the multiple reference keywords. Further, story classifier 570 may be configured to determine a category to which the digital story component to be classified, if the second similarity is greater than a threshold value.

Further, story classifier 570 may be configured to store the classified combined object and narration and/or description in one of the multiple directories in database 130, based at least in part on the classified multiple categories.

Content generator 580 may be configured to select and/or determine at least one directory that corresponds to at least one category, based on the user input to select the at least one category from among the multiple classified categories. Further, content generator 580 may be configured to select and/or extract at least one combined object and description (e.g., at least one digital story component) that corresponds to the at least one selected category from the at least one directory in database 130.

Further, content generator 580 may be configured to generate and/or finalize a whole digital story, based on the at least one selected combined object and narration and/or description (e.g., the at least one selected digital story component). For example, but not as a limitation, content generator 580 may be configured to generate video content that includes an image of the object and the narration and/or description associated with the object by using a well-known story telling content generating mechanism or template. For example, content generator 580 may execute a digital storytelling program on first device 120 to generate a digital story, in which multiple objects and narrations and/or descriptions associated with the multiple objects are contextually displayed.

Transmitter 590 may be configured to transmit the combined object and narration and/or description (e.g., the digital story component) to second device 140 via network 110. For example, but not as a limitation, second device 140 may refer to a mobile device that is communicatively coupled to first device 120. For another example, second device 140 may refer to one or more servers hosted and/or supported by a service providing organization or entity that provides content market services, content providing services, and/or social network services to first device 120.

Further, transmitter 590 may be configured to transmit the generated digital story (e.g., video content) to at least one of database 130 or second device 140.

Thus, FIG. 5 shows an example device by which at least portions of a video content providing scheme may be implemented, in accordance with various embodiments described herein. system configuration 10 may include, at least, a first device 110, a second device 120 and a database 130

Figure 6:
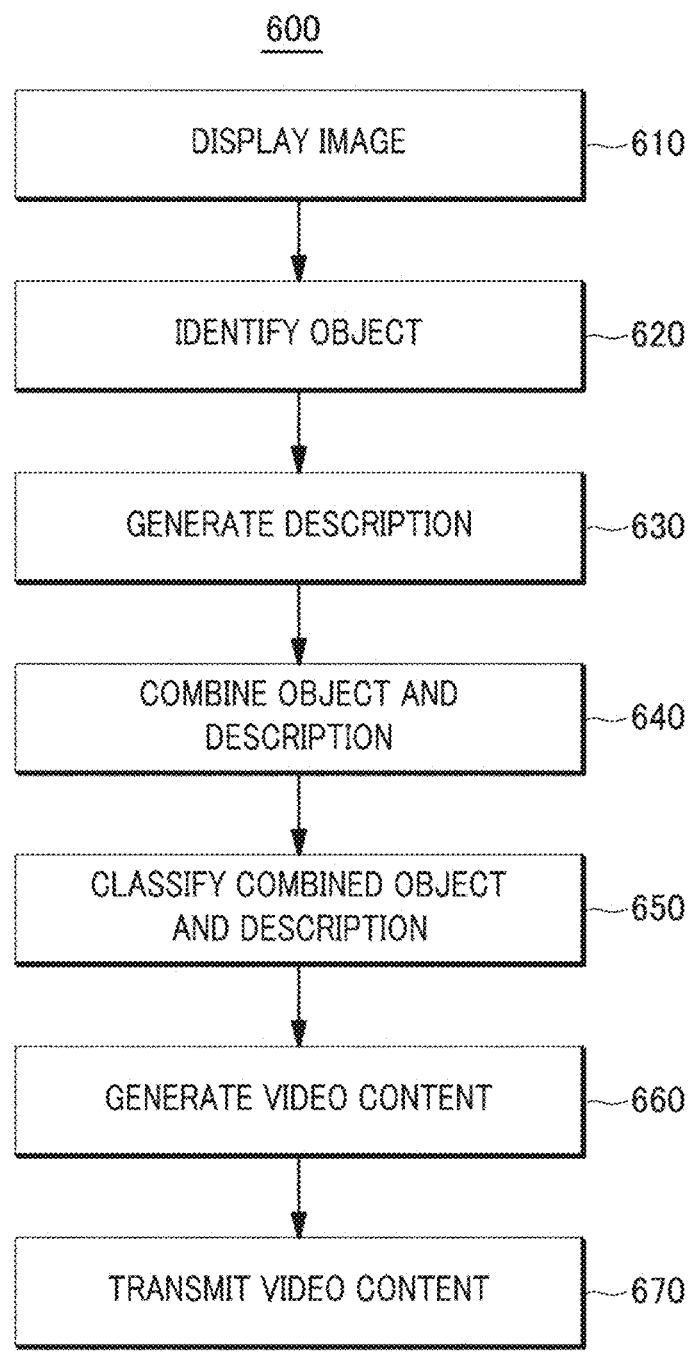
FIG. 6 shows an example processing flow of operations by which at least portions of a video content providing scheme may be implemented, in accordance with various embodiments described herein.

FIG. 6 shows an example processing flow 600 of operations by which at least portions of a video content providing scheme may be implemented, in accordance with various embodiments described herein. The operations of processing flow 600 may be implemented in system configuration 10 including, at least, first device 120, database 130 and second device 140, as illustrated in FIG. 1. Processing flow 600 may include one or more operations, actions, or functions as illustrated by one or more blocks 610, 620, 630, 640, 650, 660 and/or 670. Although illustrated as discrete blocks, various blocks may be divided into additional blocks, combined into fewer blocks, or eliminated, depending on the desired implementation. Processing may begin at block 610.

Block 610 (Display Image) may refer to first device 120 displaying an image on a display that may be part of, or communicatively coupled to, first device 120. The displayed image may refer to, as non-limiting examples, at least one of a picture, a frame or a sequence of frames from video content such as video-on-demand (VOD) content, real-time broadcasting content, etc. Processing may proceed from block 610 to block 620.

Block 620 (Identify Object) may refer to first device 120 identifying an object from the displayed image. At block 620, first device 120 may receive a user input to select the object included in the displayed image. Further, first device 120 may identify an image of the object based on the user input to select the object. For example, first device 120 may identify the image of the object by using any well-known object recognition schemes or image extracting schemes.

In some embodiments, first device 120 may identify images of multiple objects from the displayed image, when first device 120 receives a predefined input such as one or more predefined gesture commands, one or more predefined touch commands, or one or more predefined voice commands. Non-limiting examples of such predefined touch commands may include a touch input in the form of a star, input as a sweeping or swiping motion by a user's finger. For example, but not as a limitation, first device 120 may identify images of all objects depicted on the displayed image, when first device 120 receives a predefined touch input, e.g., a star on the displayed image. Thus, images of all objects may presently and subsequently identified as subjects for digital storytelling, in accordance with one or more embodiments described herein.

In some other embodiments, first device 120 may identify an image of a predefined object from the displayed image, when first device 120 receives a predefined input such as one or more predefined gesture commands, one or more predefined touch commands, or one or more predefined voice commands. Non-limiting examples of such predefined touch commands may include a touch input in the form of a triangle. For example, but not as a limitation, a user of first device 120 has already known that if he/she draws a triangle on an image displayed on first device 120 by a finger, an automobile object included in the image is selected. Further, information regarding a condition, in which first device 120 identifies an automobile object from an image if first device 120 receives a triangle touch input, may be previously defined and/or stored in first device 120. Thus, first device 120 may identify an image of a predefined object (e.g., an automobile) on the displayed image, when first device 120 receives a predefined touch inputs, e.g., a triangle on the displayed image. Processing may proceed from block 620 to block 630.

Block 630 (Generate Description) may refer to first device 120 generating a narration and/or description that is to be associated with the identified object. At block 630, first device 120 may receive a narrative user input to the identified object. Non-limiting examples of the user input to be associated with the identified object may include at least one of an audio input, a gesture input, a text input, or any combination thereof. Further, first device 120 may generate the narration and/or description, based at least in part on the narrative user input to the identified object. For example, the narration and/or description may include a caption, voice data, or text data.

In some embodiments, first device 120 may identify, receive, copy and/or extract a text or audio from the received narrative user input to the identified object by using any well-known voice or text recognition and extracting schemes. In some other embodiments, first device 120 may translate the received gesture user input into text or audio. Further, first device 120 may convert the identified and/or extracted text or audio into the narration and/or description. Processing may proceed from block 630 to block 640.

Block 640 (Combine Object and Description) may refer to first device 120 combining the object identified at block 620 and the narration and/or description generated at block 630. In some embodiments, first device 120 may combine the object and the narration and/or description so that first device 120 generates a digital story component that is to be used to generate a whole digital story. The digital story component may include one or more images and narrations and/or descriptions associated with respective one of the one or more images. Processing may proceed from block 640 to block 650.

Block 650 (Classify Combined Object and Description) may refer to first device 120 classifying the combined object and narration and/or description into one of multiple categories, based on at least one of the object or the narration and/or description. In some embodiments, first device 120 may classify the digital story component in which the object and the narration and/or description are combined into one of the multiple categories, automatically, by using a well-known automatic classifying mechanism using at least one of clustering, classification, correlation or context recognition. Further, at block 650, first device 120 may store the classified combined object and description (i.e., a digital story component) in one of multiple directories in database 130, based at least in part on the multiple categories. Each of the multiple directories in database 130 may correspond to each of the multiple categories. Processing may proceed from block 650 to block 660.

Block 660 (Generate Video Content) may refer to first device 120 generating video content (i.e., a whole digital story) that includes at least one combined object and description (i.e., a digital story component). In some embodiments, first device 120 may generate and/or finalize a whole digital story, in which multiple objects and narrations and/or descriptions associated with the multiple objects are contextually displayed. For example, first device 120 may generate the video content by using a well-known story telling content generating mechanism or template.

In some embodiments, at block 660, first device 120 may receive a user input to select at least one category from among the multiple classified categories. For example, first device 120 may receive an input that includes a name or a keyword that corresponds to the at least one category. Further, first device 120 may select and/or determine at least one directory that corresponds to the at least one selected category, based on the received user input. Further, first device 120 may select and/or extract at least one combined object and description (e.g., at least one digital story component) that corresponds to the at least one selected category from the at least one directory in database 130. Further, first device 120 may generate the video content (i.e., the whole digital story) t, based on the at least one selected combined object and description (e.g., the at least one selected digital story component). Processing may proceed from block 660 to block 670.

Block 670 (Transmit Video Content) may refer to first device 120 transmitting the generated video content (e.g., the digital story) to second device 140 via network 110.

Thus, FIG. 6 shows an example processing flow 600 of operations by which at least portions of a video content providing scheme may be implemented, in accordance with various embodiments described herein.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
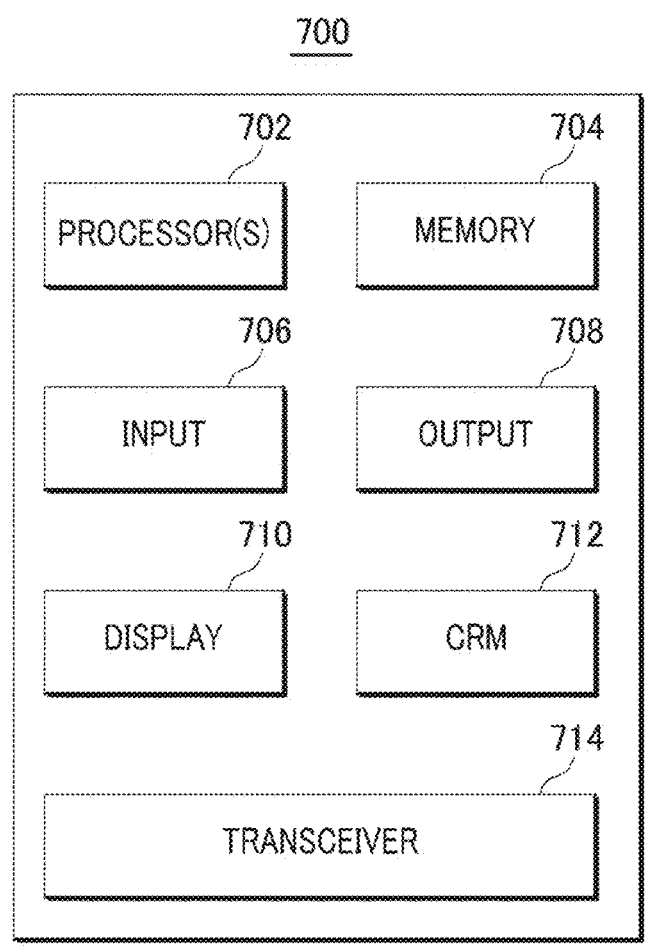
FIG. 7 shows an illustrative computing embodiment, in which any of the processes and sub-processes of a video content providing scheme may be implemented as computer-readable instructions stored on a computer-readable medium, in accordance with various embodiments described herein.

FIG. 7 shows an illustrative computing embodiment, in which any of the processes and sub-processes of a video content providing scheme may be implemented as computer-readable instructions stored on a computer-readable medium, in accordance with various embodiments described herein. The computer-readable instructions may, for example, be executed by a processor of a device, as referenced herein, having a network element and/or any other device corresponding thereto, particularly as applicable to the applications and/or programs described above corresponding to the configuration 10 for transactional permissions.

In a very basic configuration, a computing device 700 may typically include, at least, one or more processors 702, a system memory 704, one or more input components 706, one or more output components 708, a display component 710, a computer-readable medium 712, and a transceiver 714.

Processor 702 may refer to, e.g., a microprocessor, a microcontroller, a digital signal processor, or any combination thereof.

Memory 704 may refer to, e.g., a volatile memory, non-volatile memory, or any combination thereof. Memory 704 may store, therein, an operating system, an application, and/or program data. That is, memory 704 may store executable instructions to implement any of the functions or operations described above and, therefore, memory 704 may be regarded as a computer-readable medium.

Input component 706 may refer to a built-in or communicatively coupled keyboard, touch screen, or telecommunication device. Alternatively, input component 706 may include a microphone that is configured, in cooperation with a voice-recognition program that may be stored in memory 704, to receive voice commands from a user of computing device 700. Further, input component 706, if not built-in to computing device 700, may be communicatively coupled thereto via short-range communication protocols including, but not limitation, radio frequency or Bluetooth.

Output component 708 may refer to a component or module, built-in or removable from computing device 700, that is configured to output commands and data to an external device.

Display component 710 may refer to, e.g., a solid state display that may have touch input capabilities. That is, display component 710 may include capabilities that may be shared with or replace those of input component 706.

Computer-readable medium 712 may refer to a separable machine readable medium that is configured to store one or more programs that embody any of the functions or operations described above. That is, computer-readable medium 712, which may be received into or otherwise connected to a drive component of computing device 700, may store executable instructions to implement any of the functions or operations described above. These instructions may be complimentary or otherwise independent of those stored by memory 704.

Transceiver 714 may refer to a network communication link for computing device 700, configured as a wired network or direct-wired connection. Alternatively, transceiver 714 may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A digital storytelling apparatus, comprising:
a processor having computer-executable components, comprising:
an object identifier configured to extract an identified image of an object from a displayed image;
an input receiver configured to:
receive a predefined user input to be associated with the extracted image of the object, wherein the predefined user input includes a touch input in the form of a symbol on a display of the apparatus, and
receive a second user input that includes a voice input;
a data generator configured to:
determine whether the second user input is received within a predetermined time after receiving the predefined user input,
responsive to a determination that the second user input is received within the predetermined time after receiving the predefined user input, translate the second user input into text data, and
generate a description to be associated with the extracted object, based on the received predefined user input and the text data, wherein the description to be associated with the extracted image of the object is generated as at least one of a text caption or voice data description;
a story generator configured to combine the extracted image of the object and the generated description to generate a digital story component,
wherein the input receiver is further configured to:
receive a second user input to define a plurality of categories,
a category manager configured to determine a plurality of directories that respectively correspond to the plurality of categories in a database, based on the received second user input;
a story classifier configured to:
classify the combined extracted image of the object and generated description into one of the plurality of defined categories, based on at least one of the extracted image of the object or the generated description, and
store the combined extracted image of the object and the generated description in one of the plurality of directories, based on the classified defined category;
wherein the input receiver is further configured to:
receive a third input to select the classified defined category from the plurality of defined categories; and
a content generator configured to:
select the combined extracted image of the object and generated description corresponding to the selected classified defined category from the database, and
generate video content based on the selected combined extracted image of the object and generated description.

2. The digital storytelling apparatus of claim 1, wherein the database is at least one of a local memory of the apparatus or a cloud datacenter.

3. The digital storytelling apparatus of claim 1, further comprising:
a transmitter configured to transmit the combined extracted image of the object and generated description to a device communicatively coupled to the apparatus.

4. The digital storytelling apparatus of claim 1, further comprising:
a metadata generator configured to generate metadata associated with the extracted image of the object,
wherein the story generator is further configured to combine the generated metadata with the combined extracted image of the object and generated description.

5. The digital storytelling apparatus of claim 4, wherein the metadata includes at least one of a tag or a label that includes time or location information associated with the extracted image of the object.

6. A method performed under control of an apparatus, comprising:
receiving a predefined user input, wherein the predefined user input includes touch input in the form of a symbol on a display of the apparatus;
extracting an identified image of an object from a displayed image, based on the received predefined user input, the predefined user input being associated with the extracted image of the object;
receiving a second user input that includes a voice input;
determining whether the second user input is received within a predetermined time after receiving the predefined user input;
responsive to a determination that the second user input is received within the predetermined time after receiving the predefined user input, translating the second user input into text data;
generating a description to be associated with the extracted image of the object, based on the received predefined user input and the text data, the description to be associated with the extracted image of the object being generated as at least one of a text caption or voice data description;
combining the extracted image of the object and the generated description to generate a digital story component;
receiving a third input to define a plurality of categories;
determining a plurality of directories that respectively correspond to the plurality of categories in a database, based on the received third input;
classifying the combined extracted image of the object and generated description into one of the plurality of categories, based on at least one of the extracted image of the object or the generated description;
storing the combined extracted image of the object and generated description in one of the plurality of directories, based on the classified defined category;
receiving a fourth input to select the classified defined category from the plurality of defined categories;
selecting the combined extracted image of the object and generated description corresponding to the selected classified defined category from the database; and
generating video content based on the selected combined extracted image of the object and description.

7. The method of claim 6, further comprising:
transmitting the combined extracted image of the object and description to a device communicatively coupled to the apparatus.

8. The method of claim 6, further comprising:
generating metadata associated with the extracted image of the object; and
combine the generated metadata with the combined extracted image of the object and generated description,
wherein the metadata includes at least one of a tag or a label that includes time or location information associated with the extracted image of the object.

9. A non-transitory computer-readable storage medium having thereon computer-executable instructions that, in response to execution, cause an apparatus to perform operations, comprising:
receiving a predefined user input, wherein the predefined user input includes touch input in the form of a symbol on a display of the apparatus;
extracting an identified image of an object from a displayed image, based on the received predefined user input, the predefined user input being associated with the extracted image of the object;
receiving a second user input that includes a voice input;
determining whether the second user input is received within a predetermined time after receiving the predefined user input;
responsive to a determination that the second user input is received within the predetermined time after receiving the predefined user input, translating the second user input into text data;
generating a description to be associated with the extracted image of the object, based on the received predefined user input and the text data, the description to be associated with the extracted image of the object being generated as at least one of a text caption or voice data description;
combining the extracted image of the object and the generated description to generate a digital story component; and
classifying the combined extracted image of the object and generated description into one of the plurality of categories, based on at least one of the extracted image of the object or the generated description;
receiving a third input to define a plurality of categories;
determining a plurality of directories that respectively correspond to the plurality of categories in a database, based on the received third input;
classifying the combined extracted image of the object and generated description into one of the plurality of categories, based on at least one of the extracted image of the object or the generated description;
storing the combined extracted image of the object and generated description in one of the plurality of directories, based on the classified defined category;
receiving a fourth input to select the classified defined category from the plurality of defined categories;
selecting the combined extracted image of the object and generated description corresponding to the selected classified defined category from the database; and
generating video content based on the selected combined extracted image of the object and description.

10. The non-transitory computer-readable storage medium of claim 9, wherein the classifying comprises:
calculating similarities between the extracted image of the object and each of stored multiple reference object images that respectively correspond to each of the plurality of categories;
determining one of the multiple reference object images that has a similarity greater than a threshold value; and
classifying the combined extracted image of the object and generated description into one of the plurality of categories that corresponds to the determined one of the multiple reference object images.

* * * * *